(12) United States Patent
Frick

(10) Patent No.: US 7,002,669 B2
(45) Date of Patent: Feb. 21, 2006

(54) DEVICE FOR DISTANCE MEASUREMENT

(75) Inventor: Rainer Frick, Olching (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 165 days.

(21) Appl. No.: 10/485,699

(22) PCT Filed: Aug. 9, 2002

(86) PCT No.: PCT/DE02/03026

§ 371 (c)(1),
(2), (4) Date: Feb. 2, 2004

(87) PCT Pub. No.: WO03/016945

PCT Pub. Date: Feb. 27, 2003

(65) Prior Publication Data
US 2004/0222366 A1 Nov. 11, 2004

(30) Foreign Application Priority Data
Aug. 9, 2001 (DE) ................................ 101 39 237

(51) Int. Cl.
G01C 3/08 (2006.01)
G02B 5/08 (2006.01)
(52) U.S. Cl. ................. 356/4.01; 356/5.01; 356/139.1; 359/861
(58) Field of Classification Search ..................... None
See application file for complete search history.

(56) References Cited

U.S. PATENT DOCUMENTS 3,692,414 A * 9/1972 Hosterman et al. ......... 356/608
3,866,038 A * 2/1975 Korth .......................... 250/236
4,456,829 A * 6/1984 Fohey ...................... 250/559.23
4,606,601 A 8/1986 Starkweather
4,668,859 A 5/1987 Winterer (Continued)

FOREIGN PATENT DOCUMENTS

DE          34 23 536         1/1986

(Continued)

Primary Examiner—Thomas H. Tarcza
Assistant Examiner—Isam Alsomiri
(74) Attorney, Agent, or Firm—W. F. Fasse; W. G. Fasse

(57) ABSTRACT

The invention relates to a device with a detector element for receiving a light beam reflecting on an object, wherein means for detecting the light beam are provided in the detector element. The invention also relates to a method for distance measurement using said receiver device. A device for determining the distance between a vehicle and an obstacle or a vehicle driving ahead is already known as per DE 197 13 826 A1, wherein a pulsed laser beam serving as send signal scans line-by-line a two-dimensional area using a self-rotating polygonal mirror, wherein said polygonal mirror has a plurality of mirror surfaces that are bent at different angles. The pulse beam reflecting on the object is focused on a detector element by optical lenses. Said device known in prior art requires a polygonal mirror that is complicated to produce and a complicated evaluation electronics due to the fact that, inter alia, the scanning impulses for the control of the laser diode have to be synchronized with the angular position of the polygonal mirror. The invention provides for a self-rotating polygonal mirror with a plurality of mirror surfaces that are bent at a given angle against the rotational axis of said polygonal mirror as receiver device so that the reflecting light beam is deflected in said mirror surfaces by means of an optics system and focused on the detector element.

7 Claims, 3 Drawing Sheets

U.S. PATENT DOCUMENTS

| | | | |
|---|---|---|---|
| 4,878,720 | A | 11/1989 | Hanke et al. |
| 5,189,545 | A | 2/1993 | Takata et al. |
| 5,223,956 | A | 6/1993 | Kramer et al. |
| 5,227,784 | A | 7/1993 | Masamori et al. |
| 5,293,162 | A | 3/1994 | Bachalo |
| 5,309,212 | A | 5/1994 | Clark |
| 5,367,399 | A | 11/1994 | Kramer |
| 5,426,529 | A | 6/1995 | Zelenka |
| 5,757,501 | A | 5/1998 | Hipp |
| 5,864,391 | A | 1/1999 | Hosokawa et al. |
| 5,933,225 | A | 8/1999 | Yamabuchi |
| 6,456,024 | B1 | 9/2002 | Schmider et al. |
| 2002/0005941 | A1 * | 1/2002 | Kawaguchi et al. ........ 356/4.01 |
| 2002/0018198 | A1 * | 2/2002 | Pierenkemper ............ 356/4.01 |
| 2004/0212863 | A1 | 10/2004 | Schanz et al. |
| 2004/0233491 | A1 | 11/2004 | Schanz et al. |
| 2004/0240020 | A1 | 12/2004 | Schanz |

FOREIGN PATENT DOCUMENTS

| | | |
|---|---|---|
| DE | 37 07 023 | 9/1988 |
| DE | 40 15 920 | 11/1990 |
| DE | 41 40 716 | 6/1992 |
| DE | 4115747 | 11/1992 |
| DE | 41 32 025 | 4/1993 |
| DE | 43 04 499 | 9/1993 |
| DE | 42 39 061 | 5/1994 |
| DE | 195 30 281 | 2/1997 |
| DE | 19713826 | 10/1997 |
| DE | 19704220 | 8/1998 |
| EP | 0138646 | 4/1985 |
| EP | 0805357 | 11/1997 |
| EP | 1104950 | 6/2001 |
| GB | 1562190 | 3/1980 |
| JP | 55-046712 | 4/1980 |
| JP | 60-079312 | 5/1985 |
| JP | 62-008119 | 1/1987 |
| JP | 09-021872 | 1/1997 |
| JP | 10-186260 | 7/1998 |
| WO | WO92/05455 | 4/1992 |
| WO | WO93/06517 | 4/1993 |

* cited by examiner

DEVICE FOR DISTANCE MEASUREMENT

BACKGROUND OF THE INVENTION

The invention relates to a device for measuring the distance to an object illuminated by a light beam in accordance with the preamble of Patent claim 1.

Different methods are used in monitoring systems for motor vehicles for measuring the distances to obstacles or to vehicles traveling ahead. These methods use for a measuring medium radar impulses, microwaves, ultrasound waves, or infrared radiation. As measuring methods for determining the distance, one can use either the measuring of the transit time or one may use a triangulation method.

Thus, an apparatus is known, for example from German Patent Publication DE 197 04 220 A1 for determining the spacing of an obstacle from a vehicle in which a semiconductor laser, a radar transmitter, or an ultrasound generator is used for the emission of scanning impulses. The transmitted signal that has been reflected by an obstacle is detected by a receiver apparatus. The distance to the obstacle is determined with a time measuring unit for acquiring the time between the sending of the transmitted signal and its detection point of time.

Furthermore, a radar apparatus for a vehicle safety spacing control system is known from German Patent Publication DE 197 13 826 A1 which performs a two dimensional scanning operation by using a rotating polygonal mirror in order to determine, for example relative data such as a distance, a direction, or a speed of a vehicle traveling ahead. In this apparatus an infrared impulse beam is generated by a laser diode. This beam is reflected by a reflection mirror onto the rotating polygonal mirror. The polygonal mirror comprises a plurality of mirror surfaces that are inclined at different angles, so that thereby a determined measuring range is scanned by the transmitter beam in a line-by-line fashion due to the differently inclined mirror surfaces of the polygonal mirror. In case an object is present in this measuring range, the transmitter beam reflected there is detected by a detector element. The two-dimensional scanning operation takes place due to the fact that a pulse beam is directed onto each mirror surface of the polygonal mirror. Thereby, the direction of each beam reflected by each mirror surface is changed by the rotation of the polygonal mirror in such a way that a horizontal scanning operation is accomplished in the horizontal level. The scanning rate of a line can be increased by raising the impulse frequency. When the pulse beam is reflected by a next mirror surface, the horizontal scanning operation is repeated in a different elevational position which is proportional to the angle of inclination of each mirror surface. This scanning operation is repeated at different locations of the elevational direction, so that thereby a two-dimensional scanning operation is realized. The number of different elevational directions which thereby occur, that is the number of the lines, depends on the number of the mirror surfaces which are provided with different inclinations relative to the rotation axis of the polygonal mirror.

If such a measuring apparatus is used in a vehicle, it is possible to adapt the scanning operation for the recognition of a vehicle traveling ahead, to the incline characteristic of the road. For example, if the road rises ahead of the vehicle, the position of a vehicle traveling ahead will also be higher than the position of the vehicle equipped with the measuring apparatus. In order to detect with certainty the transmitter signal reflected by the vehicle traveling ahead also in this situation the number of measurements made in the respective elevational direction is increased, i.e. the impulse frequence of the transmitter signal is increased. In order to be able to perform such a control of the impulse frequency of the transmitter signal, an inclination angle sensor installed in the vehicle provides a respective measured value.

On the one hand the timed control which is expensive to realize is a disadvantage in this known measuring apparatus. The timed control requires that the transmitter must produce an impulse beam with the correct impulse frequency in dependency on the rotation angular position of the polygonal mirror. On the other hand a transmitter is required that is capable of realizing the respective impulse frequencies.

Thus, it is the object of the present invention that the above mentioned apparatus for measuring the distance is improved with regard to a simpler evaluation of the detected light beams.

SUMMARY OF THE INVENTION

This object is realized according to the features of Patent claim 1, wherein a rotating polygonal mirror is provided as a receiver apparatus of the light beam reflected by an object, said polygonal mirror comprising a plurality of mirror surfaces which are inclined at a determined angle relative to the rotation axis of the rotating polygonal mirror, and wherein the reflected light beam is focused through such a mirror surface onto the detector element by means of an optic allocated to each mirror surface of the polygonal mirror and rotating in synchronism with the polygonal mirror.

With the apparatus according to the invention it is possible to derive, from the detected continuous light beam that has been reflected by an object present within the measuring range and with the aid of the transit time method, the distance as well as the associated position of the object on the basis of the angular position of the polygonal mirror.

The optic allocated to each mirror surface of the polygonal mirror comprises preferably a lens system particularly a single lens. Thus, a simple construction is achieved for the entire receiver apparatus. In a further preferred embodiment of the invention the optics allocated to the mirror surfaces are positioned approximately along a circular line around the rotation axis of the polygonal mirror. Thereby, a screening is arranged between neighboring optics, that is, in the area of the edges of the polygonal mirror. Thus, a defined opening angle is achieved so that the polygonal mirror which rotates together with the optics and with the screens scans the measuring range with this opening angle, i.e. the range irradiated by the light source. Moreover, thereby it is assured that two mirror surfaces following each other sequentially cannot be impinged upon simultaneously by reflected light beams. Depending on the desired resolution, the polygonal mirror according to the invention can be equipped with three, four or five mirror surfaces. Thereby, it has been found to be advantageous to construct the screens respectively in such a manner that an opening angle of 60° is produced.

A simple distance measuring method can be performed with the apparatus according to the invention in which a continuously emitted and modulated light beam irradiates a spatial range that is to be monitored as a measuring range, wherein the distance of the object can be derived by a phase comparing with the detected light beam reflected by an object and wherein the position of the object can be derived from the angular position of the polygonal mirror.

A further improvement of the method is achieved in that the light beam is produced by modulating a pseudo noise signal. A good interference signal suppression can be achieved with a light beam modulated in this fashion in that the distance and the position of the object which reflected the light beam is determined by correlation between the pseudo noise signal and the detected signal.

BRIEF DESCRIPTION OF THE DRAWING

The invention will be explained in more detail in the following with reference to an example embodiment in connection with the accompanying drawings.

DETAILED DESCRIPTION OF THE DRAWING

Figure 1:
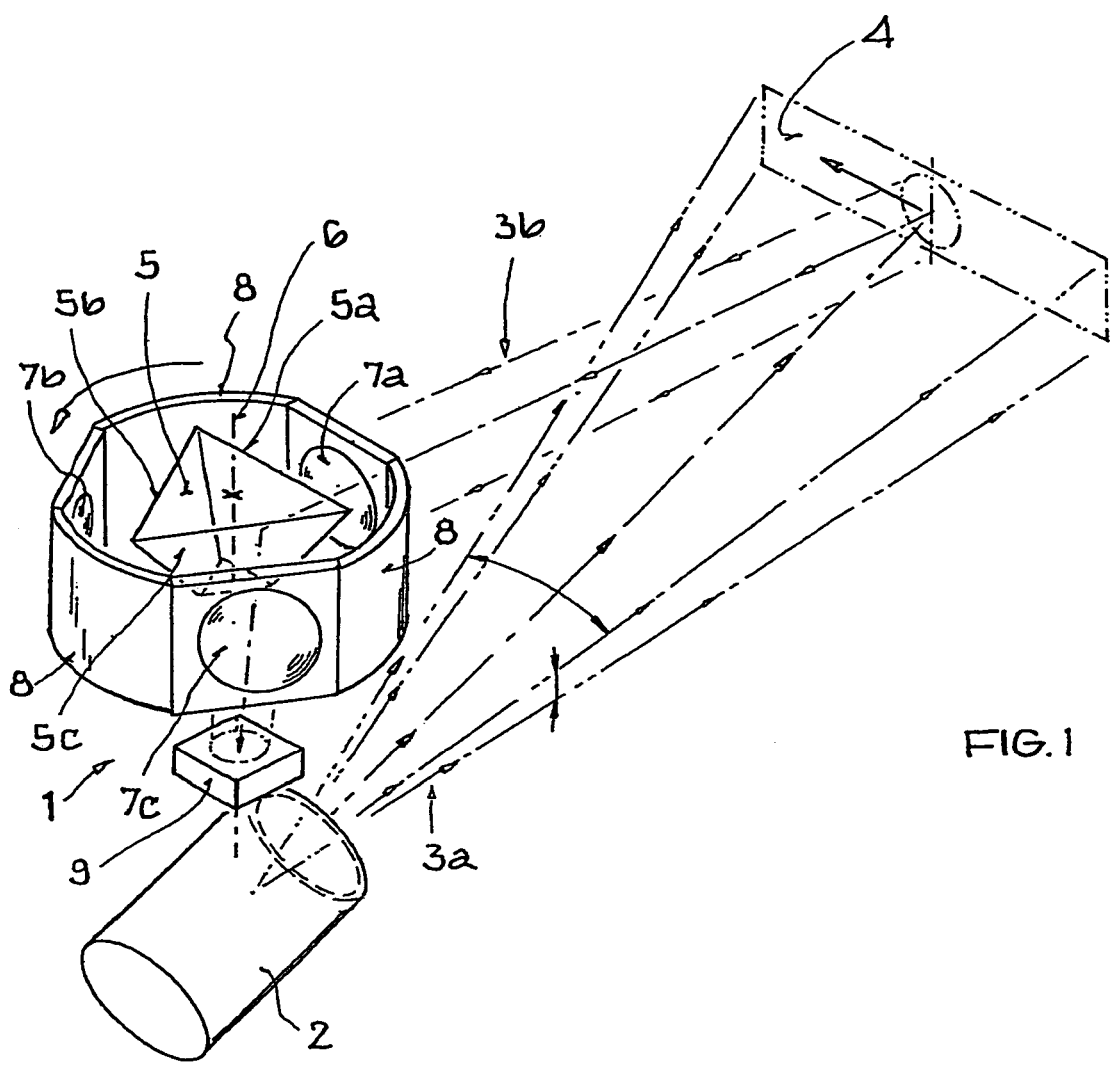
FIG. 1 shows a schematic illustration of an apparatus according to the invention for measuring the distance with a ray path of a light beam produced by a transmitter apparatus.

The arrangement according to FIG. 1 shows an apparatus 1 according to the invention for receiving a light beam 3a produced by a transmitter 2. The light beam 3a is directed onto a spatial range 4 and is reflected there by an object for determining the object's distance to the receiver 1.

Figure 2:
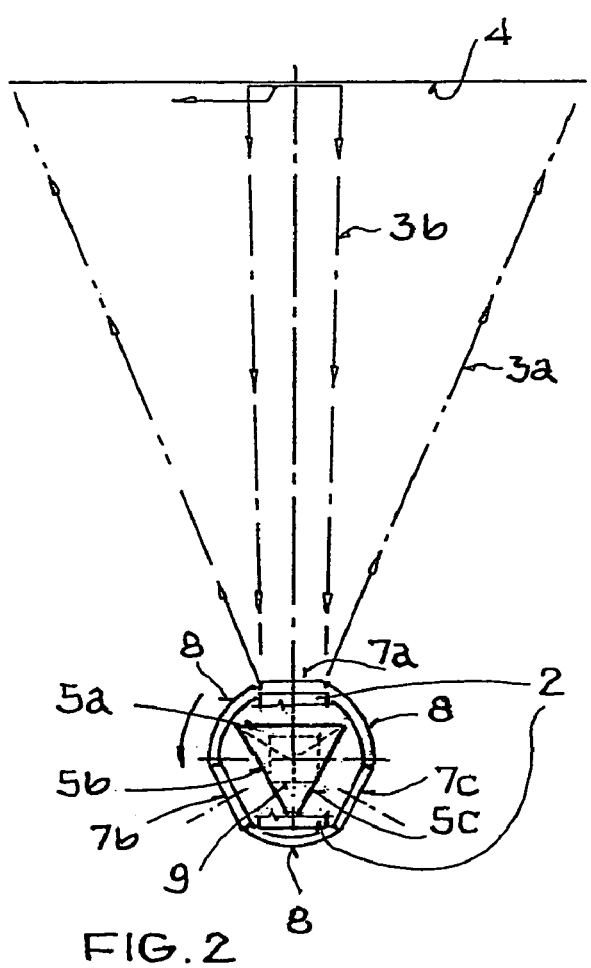
FIG. 2 shows a top plan view of the apparatus according to FIG. 1.
Figure 3:
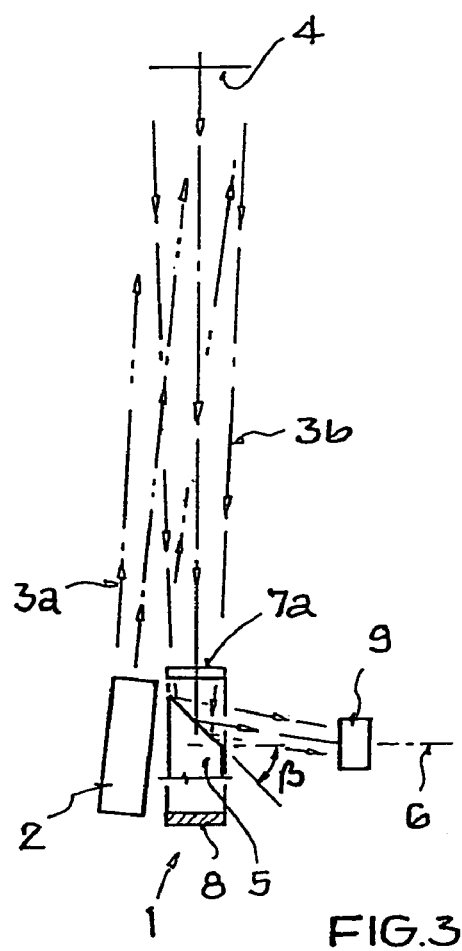
FIG. 3 shows a side view of the apparatus according to FIG. 1.

The transmitter 2 comprises a semiconductor laser functioning as a light source for producing an infrared light beam 3a, which is directed as a transmitter signal onto the spatial range 4 forming a measuring range where the light beam is reflected by an object (not shown) of which the distance is to be determined, in order to then be detected as a reflected light beam 3b by the receiver 1. The receiver 1 comprises as its central component a polygonal mirror 5 that rotates about a rotation axis 6 and has three mirror surfaces which, as shown in FIGS. 1 and 2, form an equilateral triangle. Furthermore, a lens system 7 rotates with the polygonal mirror 5. The lens system 7 comprises three optical lenses 7a, 7b and 7c which are respectively arranged opposite a mirror surface of the polygonal mirror 5. In the angular position of the polygonal mirror 5 shown in FIG. 1 the reflected light beam 3b is focused onto a detector element 9 by means of the lens 7a and through the mirror surface of the polygonal mirror 5 positioned opposite this lens. The detector element 9 is arranged in the direction of the rotation axis 6 of the polygonal mirror 5. For this purpose and as shown in FIG. 3 the mirror surface 5a of the polygonal mirror 5 is inclined in such a way that following the deflection of the reflected light beam 3b by this mirror surface 5a this light beam 3b impinges on the detector element 9. The other two mirror surfaces 5b and 5c of this polygonal mirror 5 have the same inclination so that upon rotation of this receiver apparatus the reflected light beam 3b will also be deflected by these other mirror surfaces onto the detector element 9.

As shown in FIG. 2, respective screens 8 are arranged along a circular line around the polygonal mirror 5 between the optical lenses 7a, 7b and 7c in order to thereby scan the measuring range 4 with a defined opening angle α. Without these screens 8 there would be an opening angle of 120° due to the cross-section of the polygonal mirror 5 forming a unilateral triangle. Thereby, it would then be a disadvantage that for a certain angular position of the polygonal mirror simultaneously two neighboring mirror surfaces could receive a light beam. Thus, it is advantageous to construct these screens 8 in such a way that the opening angle α is, for example 60°. Due to the rotation of the receiver 1 the space range 4 is scanned with an opening angle α whereby the reflected light beam is focused onto the detector element 9. The distance of an object is determined from the received signal of the detector element 9, for example by means of a phase transit time method. The associated position of the object is determined from the angular position of the polygonal mirror. The resolution capability of this arrangement can be increased if, instead of the three sided polygonal mirror 5 a polygonal mirror is used with four or five mirror surfaces, whereby simultaneously an opening angle of also 60° can be realized with the described screens 8.

If the arrangement according to FIG. 1 is arranged in the area of the radiator cover of a motor vehicle, it is of advantage that the transmitter 2 is oriented in such a way that the light beam 3a is directed onto the measuring range 4 with an opening angle of about 45° and an angle of about 8° in the vertical direction.

Figure 4:
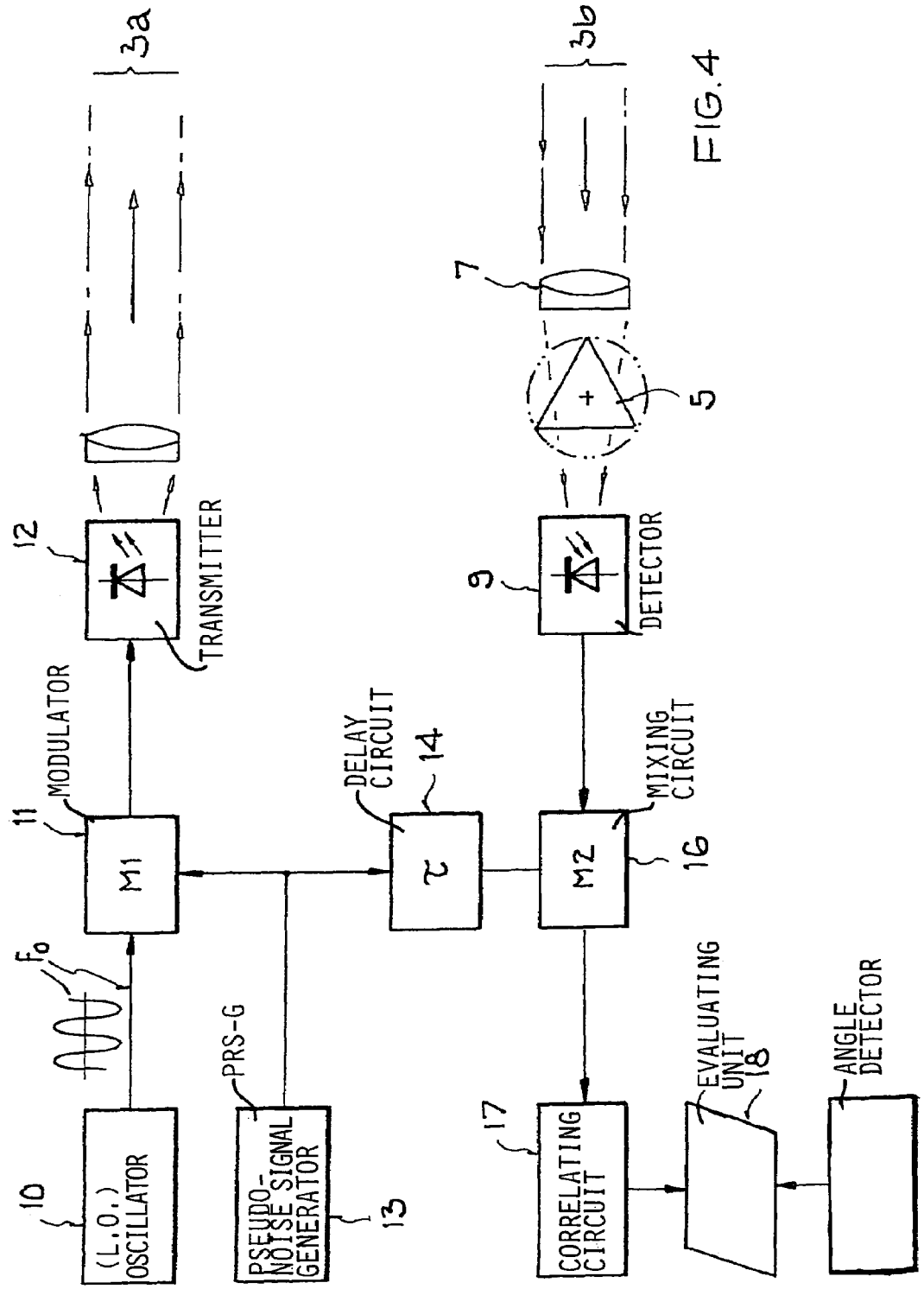
FIG. 4 is a schematic block circuit diagram for explaining the function of the arrangement with the apparatus according to the invention as shown in FIG. 1.

A method for distance measuring by using the arrangement of FIG. 1 shall be described with the block circuit diagram according to FIG. 4. As has been mentioned already above, the transmitter 2 comprises a semiconductor laser diode or an infrared transmitter diode with a control circuit. For controlling such a diode 12 of the transmitter 2 for the production of a continuous and modulated transmitter signal, a carrier signal with a frequency $f_0$ is produced by an oscillator (L.O.) 10 as a signal source. The carrier signal is modulated by a modulator (M1) 11 corresponding to a pseudo-noise sequence generated by a pseudo-noise signal generator (PRS-G) 13. The transmitter diode 12 of the transmitter 2 is triggered with this carrier signal thus modulated, whereby the transmitter diode 12 produces a pseudo-noise signal as a transmitter signal which is directed as the light beam 3a onto the measuring range 4.

The signal reflected as light beam 3b is focused onto the detector element 9 by means of the optical lens 7 and through the polygonal mirror 5. The detector element 9 produces a corresponding received signal.

This received signal is amplified, if necessary, and supplied to a mixer (M2) 16 for mixing with the pseudo-noise signal of the pseudo-noise signal generator 13. The pseudo-noise signal has been delayed by means of a delay circuit 14. The thus produced signal is fed to a correlator 17 for determining the correlation between the transmitted signal and the received signal. The result of the correlation from the correlator is evaluated by an evaluating unit 18 for determining the distance. The evaluating unit 18 also determines the direction of an object detected in the measuring range 4, together with the angle of the angular position of the receiver 1 acquired by a detector 19 according to FIG. 1.

The pseudo-noise signal train generated by the pseudo-signal generator 13 serves, in addition to producing the modulated transmitter signal, simultaneously also as a reference signal which is compared with the received measured signal. The result of this comparing provides a quantitative information regarding the distance to the detected object. The use of the auto-correlation for the measuring technical evaluation of the received light signal leads, due to the high filtering effect regarding noise signals, particularly in connection with the use in the field of motor vehicles, to a high non-susceptibility to interference because interference signals which are produced by devices of similar construction in the motor vehicle field typically have little similarity with the used measuring signal.

Thus, the arrangement according to FIG. 1 in combination with the described measuring principle of the auto-correlation can be used with advantage not only for measuring the distance to a vehicle moving ahead, but also for the closed loop distance control or in precrash systems.

What is claimed is:

1. An apparatus (1) with a detector element (9) for receiving a light beam (3a, 3b) reflected by an object, whereby means (7, 5) are provided for deflecting the reflected light beam (3b) onto said detector element (9), characterized in that a rotating polygonal mirror (5) is provided as a means for deflecting the reflected light beam (3b), said polygonal mirror having a plurality of mirror surfaces (5a, 5b, 5c) inclined at an angle (β) to the rotation axis (6) of the rotating polygonal mirror (5), whereby the detector element (9) is arranged in the direction of the rotation axis (6) of the polygonal mirror (5), and that an optic (7) is allocated to each mirror surface (5a, 5b, 5c) of the polygonal mirror (5) for focusing the reflected light beam (3b) onto the detector element (9), said optic rotating in synchronism with the polygonal mirror (5).

2. The apparatus of claim 1, characterized in that the optic (7) is constructed as a lens system.

3. The apparatus of claim 1, characterized in that the optics (7a, 7b, 7c) are arranged approximately along a circular line around the rotation axis of the polygonal mirror (5) and that screens (8) are provided between neighboring optics (7a, 7b, 7c) on the circular line.

4. The apparatus of claim 3, characterized in that for a polygonal mirror (5) with three, four or five mirror surfaces (5a, 5b, 5c), the screen (8) produces for the mirror surfaces (5a) a respective opening angle (α) of 60°.

5. The apparatus of claim 1, characterized in that the polygonal mirror (5) comprises at least three mirror surfaces (5a, 5b, 5c).

6. A method for distance measuring by means of the apparatus according to claim 1, characterized in that a continuously emitted and modulated light beam (3a) irradiates a space range (4) to be monitored, and that by phase comparing of this modulated light beam (3a) with the detected light beam (3b) the distance to an object present in the space range (4) to be monitored is determined and with the angular attitude of the polygonal mirror (5) the position of the object is determined.

7. The method of claim 6, characterized in that a pseudo-noise signal train is used for modulating the light beam (3a).

* * * * *